United States Patent
Childress et al.

(10) Patent No.: US 8,122,035 B2
(45) Date of Patent: Feb. 21, 2012

(54) METHOD AND SYSTEM FOR TRANSACTIONAL FINGERPRINTING IN A DATABASE SYSTEM

(75) Inventors: Edward T. Childress, Austin, TX (US); Rhonda L. Childress, Austin, TX (US); David B. Kumhyr, Austin, TX (US); Neil Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 1706 days.

(21) Appl. No.: 11/168,714

(22) Filed: Jun. 28, 2005

(65) Prior Publication Data

US 2006/0294057 A1 Dec. 28, 2006

(51) Int. Cl.
*G06F 7/00* (2006.01)
(52) U.S. Cl. .......... 707/758; 707/759; 707/769; 705/39; 709/224
(58) Field of Classification Search ........... 707/999.002, 707/999.003, 999.201, 758, 759, 769; 705/39; 709/224

See application file for complete search history.

(56) References Cited

U.S. PATENT DOCUMENTS

| | | | |
|---|---|---|---|
| 6,108,700 A | | 8/2000 | Maccabee et al. |
| 6,446,089 B1 * | | 9/2002 | Brodersen et al. ............ 707/201 |
| 6,598,038 B1 * | | 7/2003 | Guay et al. ........................ 707/2 |
| 6,598,058 B2 * | | 7/2003 | Bird et al. ...................... 707/201 |
| 6,618,725 B1 | | 9/2003 | Fukuda et al. |
| 7,236,972 B2 * | | 6/2007 | Lewak et al. ..................... 707/4 |
| 7,441,008 B2 | | 10/2008 | Johnson |
| 7,523,463 B2 | | 4/2009 | Sluiman et al. |
| 7,568,023 B2 | | 7/2009 | Green et al. |
| 7,877,435 B2 | | 1/2011 | Allan |
| 2002/0167942 A1 | | 11/2002 | Fulton |
| 2003/0195959 A1 | | 10/2003 | Labadie et al. |
| 2003/0212668 A1 * | | 11/2003 | Hinshaw et al. .................. 707/3 |
| 2004/0003266 A1 | | 1/2004 | Moshir et al. |
| 2004/0220947 A1 | | 11/2004 | Aman et al. |
| 2004/0244004 A1 | | 12/2004 | Pardon et al. |
| 2005/0049945 A1 * | | 3/2005 | Bourbonnais et al. .......... 705/30 |
| 2006/0149745 A1 * | | 7/2006 | Mengerink ..................... 707/10 |

\* cited by examiner

*Primary Examiner* — Shew-Fen Lin
*Assistant Examiner* — Jieying Tang
(74) *Attorney, Agent, or Firm* — Yee & Associates, P.C.; Jeffrey S. LaBaw

(57) ABSTRACT

Transactions with respect to database operations are fingerprinted by associating transaction identifiers with logged information about those database operations. An SQL query is obtained prior to its evaluation by a database engine. A transaction identifier to be associated with the SQL query is also obtained. The SQL query is then modified to generate a modified SQL query, wherein the modified SQL query includes a WHERE clause that contains an expression that always evaluates to a logical true value, and wherein the expression contains the transaction identifier. The modified SQL query is then sent to the database engine for evaluation within the data processing system. When the processing of the modified SQL query is logged with a copy of the modified SQL query, the logged information contains a copy of the transaction identifier.

20 Claims, 3 Drawing Sheets

METHOD AND SYSTEM FOR TRANSACTIONAL FINGERPRINTING IN A DATABASE SYSTEM

BACKGROUND OF THE INVENTION

1. Field of the Invention

The present invention relates to an improved data processing system and, in particular, to a method and apparatus for information processing. Still more particularly, the present invention relates generally to recording and analyzing information about the performance of database transactions in a data processing system.

2. Description of Related Art

Many enterprises rely heavily upon their information technology infrastructures to accomplish critical business tasks. However, it is not sufficient to simply complete certain computational tasks. Many data processing systems incorporate software that allows system administrators to more fully understand the manner in which a data processing system is performing its computational tasks. In order to do so, a typical data processing system contains software that allows transactions to be tracked in some manner as transactions are processed within the data processing system. The generated transactional information can be analyzed to understand various characteristics of the performance of the data processing system. For example, a system administrator may desire to spot potential processing bottlenecks or other problems. In other cases, it may be necessary for a system administrator to understand the execution path that was employed via many server applications to complete a given transaction.

A typical transaction, though, can be complex. Many applications may perform operations throughout a data processing system such that each operation only completes a portion of the transaction. In order to monitor a given transaction as various operations are performed throughout a data processing system, operations that are performed with respect to the given transaction need to be identified in some manner. Hence, a transaction identifier of some type is assigned to a given transaction. As each operation is performed with respect to a given transaction, the module or unit that performs each operation receives the transaction identifier of the given transaction. When the module or unit records or logs transactional information as it initiates, performs, or completes an operation, the module or unit also records or logs the received transaction identifier. The transactional information can be subsequently analyzed for a given transaction by correlating records that contain the transaction identifier that was associated or assigned to the given transaction.

Similarly, in order to monitor transactions from a given user or a given client application, operations that are performed with respect to the given user or the given application need to be identified in some manner, e.g., by associating a user identifier or an application identifier with those operations. As each operation is performed with respect to transactions from a given user or a given application, the module or unit that performs each operation receives the identifier that is associated with the transactions. When the module or unit records or logs transactional information as it initiates, performs, or completes an operation, the module or unit also records or logs the associated identifier. The transactional information can be subsequently analyzed by correlating records that contain the identifier that is associated or assigned to the given user or the given application.

In this manner, transactional fingerprinting may be accomplished, i.e. transactions can be fingerprinted, thereby allowing identification of information related to one or more operations that have been performed for a transaction. Identifiers are associated with transactional operations, and these identifiers are recorded within the transaction log data or transaction trace data as the operations are initiated, performed, or completed. The identifiers may serve multiple identification purposes, e.g., as described above, a user identifier, an application identifier, or a specific transaction identifier. However, in general, the data value that allows the transactional information to be correlated is called a correlating token or a correlator.

Many enterprises desire to modify application code to add instrumentation code that supports transaction analysis as an enterprise management function, particularly in accordance with the Application Response Measurement (ARM) standard. The ARM standard has been promulgated by The Open Group to assist in the development of enterprise management tools; The Open Group is a vendor-neutral and technology-neutral consortium of corporations and institutions. According to The Open Group, the ARM standard describes a common method for integrating enterprise applications as manageable entities. The ARM standard allows users to extend their enterprise management tools directly to applications creating a comprehensive end-to-end management capability that includes measuring application availability, application performance, application usage, and end-to-end transaction response time. Although the ARM standard may be used as a guiding method by enterprises for instrumenting applications to accomplish transactional fingerprinting, it may not be possible or feasible in some cases for an enterprise to do so because an enterprise may not have access or permission to modify the source code of an application to add instrumentation, e.g., ARM-compliant function calls.

With the knowledge that many enterprises desire transaction analysis as an enterprise management function, many vendors have modified their applications to provide support for transactional-fingerprinting. In particular, many commercially available database engines have an ability to produce some type of status information for each SQL (Structured Query Language) call that is processed, yet the logged transactional information is often not useful. More specifically, the granularity at which a database engine's transactional information can be analyzed is only as fine as the granularity of the correlators that are provided to the database engine. In some data processing systems, the correlators that are provided to a database engine are repetitious or non-unique because of the manner in which the infrastructure of a data processing system is configured. However, it is often not possible, feasible, or permissible to instrument a database engine to perform transactional fingerprinting as desired, and it is often not possible or feasible to restructure a data processing system merely to install transactional fingerprinting with respect to database transactions as desired.

Therefore, it would be advantageous to have a method and a system that supports transactional fingerprinting with respect to database operations. Moreover, it would be advantageous to support transactional fingerprinting with respect to database operations without requiring modifications to the database engine.

SUMMARY OF THE INVENTION

Transactions with respect to database operations are fingerprinted by associating transaction identifiers with logged information about those database operations. An SQL query is obtained prior to its evaluation by a database engine. A transaction identifier to be associated with the SQL query is also obtained. The SQL query is then modified to generate a modified SQL query, wherein the modified SQL query includes a WHERE clause that contains an expression that always evaluates to a logical true value, and wherein the expression contains the transaction identifier. The modified SQL query is then sent to the database engine for evaluation within the data processing system. When the processing of the modified SQL query is logged with a copy of the modified SQL query, the logged information contains a copy of the transaction identifier.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
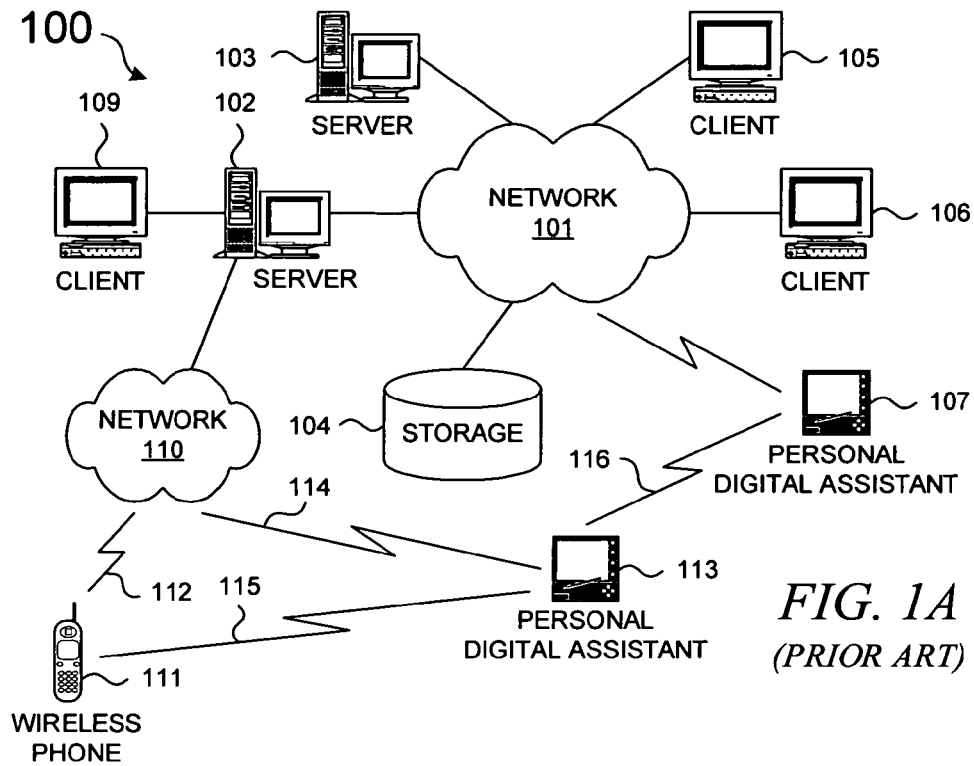
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
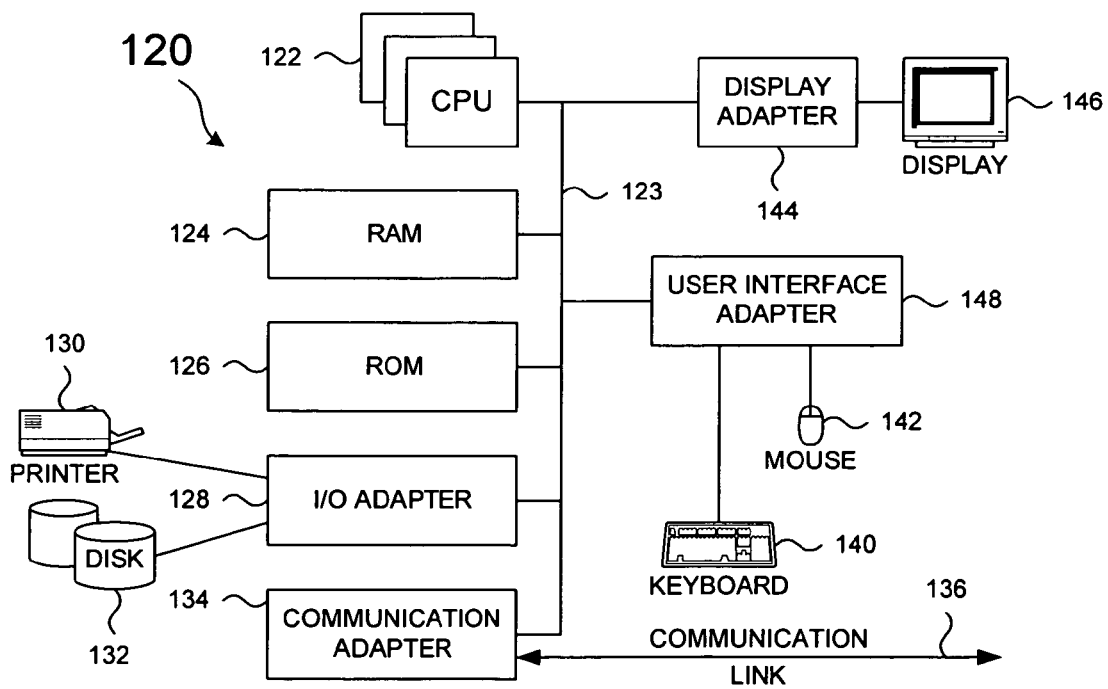
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved data processing environment. Prior to describing the present invention in more detail, some aspects of typical data processing environments are described.

The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

Certain computational tasks may be described hereinbelow as being performed by functional units. A functional unit may be represented by a routine, a subroutine, a process, a subprocess, a procedure, a function, a method, an object-oriented object, a software module, an applet, a plug-in, an ActiveX™ control, a script, or some other component of firmware or software for performing a computational task.

The descriptions of the figures herein may involve an exchange of information between various components, and the exchange of information may be described as being implemented via an exchange of messages, e.g., a request message followed by a response message. It should be noted that, when appropriate, an exchange of information between computational components, which may include a synchronous or asynchronous request/response exchange, may be implemented equivalently via a variety of data exchange mechanisms, such as messages, method calls, remote procedure calls, event signaling, or other mechanism.

Figure 2:
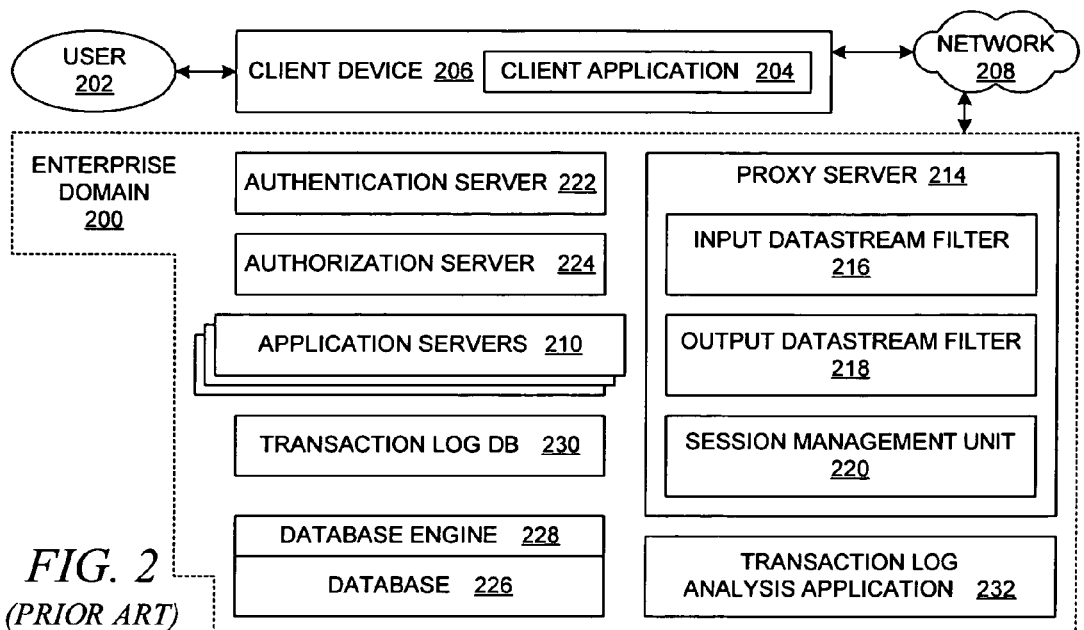
FIG. 2 depicts a block diagram that shows a typical enterprise data processing system.

With reference now to FIG. 2, a block diagram depicts a typical enterprise data processing system. Whereas FIG. 1A depicts a typical data processing system with clients and servers, in contrast, FIG. 2 shows a client within a network in relation to some of the server-side entities that may be used to support client requests to access resources. As in a typical computing environment, enterprise domain 200 hosts resources that user 202 can access, e.g., by using client application 204 on client device 206 through network 208; the computer network may be the Internet, an intranet, or other network, as shown in FIG. 1A.

Enterprise domain 200 supports multiple servers. Application servers 210 support controlled and/or uncontrolled resources through web-based applications or other types of back-end applications, including legacy applications. Reverse proxy server 214, or more simply, proxy server 214, performs a wide range of functions for enterprise domain 200. For example, proxy server 214 may cache web pages in order to mirror the content from an application server. Incoming and outgoing datastreams may be processed by input datastream filter 216 and output datastream filter 218, respectively, in order to perform various processing tasks on incoming requests and outgoing responses in accordance with goals and conditions that are specified within various policies or in accordance with a configuration of deployed software modules.

Session management unit 220 manages session identifiers, cached credentials, or other information with respect to sessions as recognized by proxy server 214. Web-based applications typically utilize various means to prompt users to enter authentication information, often as a username/password combination within an HTML form. In the example that is shown in FIG. 2, user 202 may be required to be authenticated before client 206 may have access to resources, after which a session is established for client 206. In an alternative embodiment, authentication and authorization operations are not performed prior to providing a user with access to resources on domain 200; a user session might be created without an accompanying authentication operation.

The above-noted entities within enterprise domain 200 represent typical entities within many computing environments. However, many enterprise domains have security features for controlling access to protected computational resources. A computational resource may be an application, an object, a document, a web page, a file, an executable code module, or some other computational resource or communication-type resource. A protected or controlled resource is a resource that is only accessible or retrievable if the requesting client or requesting user is authenticated and/or authorized; in some cases, an authenticated user is, by default, an authorized user. Authentication server 222 may support various authentication mechanisms, such as username/password, X.509 certificates, or secure tokens; multiple authentication servers could be dedicated to specialized authentication methods. Authorization server 224 may employ an authorization database that contains information such as access control lists, authorization policies, information about user groups or roles, and information about administrative users within a special administrative group. Using this information, authorization server 224 provides indications to proxy server 214 whether a specific request should be allowed to proceed, e.g., whether access to a controlled resource should be granted in response to a request from client 206.

As application server 222, authorization server 224, and proxy server 214 perform operations, they may need to obtain information from database 226 via database engine 228 or some other database; database engine 228 may represent a stand-alone database server or an embeddable database module. As database engine 228 processes database requests, e.g., in the form of submitted SQL (Structured Query Language) queries, database engine 228 may log, trace, or record information about its actions within transactional log database 230. Likewise, as application server 222, authorization server 224, proxy server 214 perform operations, they may also log information about their actions within transactional log database 230. Transaction log analysis application 232 may be used by a system administrator or some other type of user to analyze recorded transactions within transactional log database 230.

Figure 3:
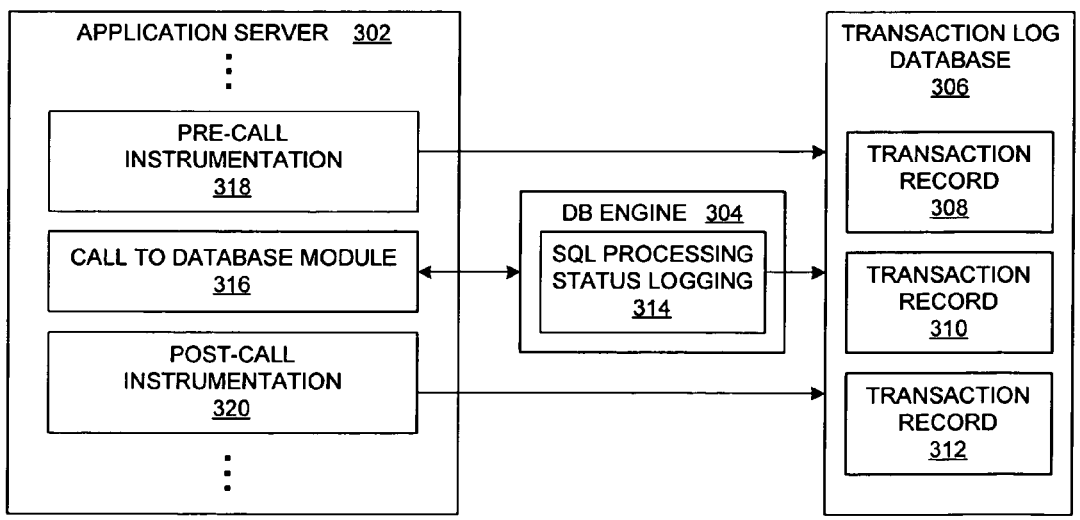
FIG. 3 depicts a block diagram that shows a typical configuration of software components that generate transaction records within a transaction log.
Figure 4:
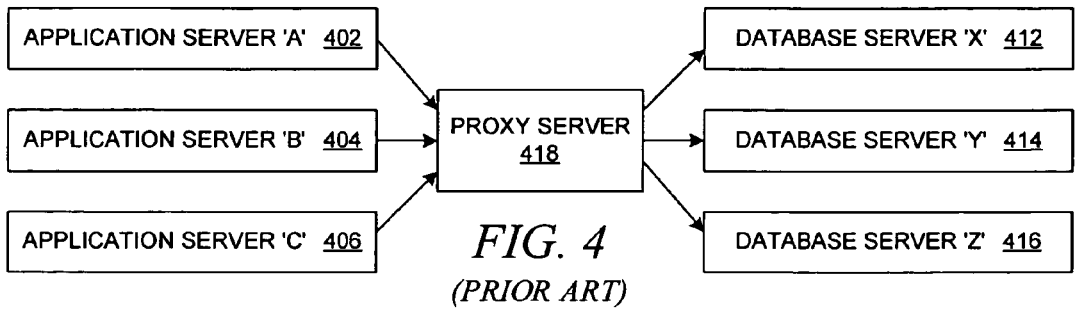
FIG. 4 depicts a block diagram that shows a typical configuration of servers along with a proxy server in an enterprise domain.

FIGS. 1A-4 depict different aspects of typical data processing systems. Although FIGS. 1A-2 also depict typical data processing systems, FIGS. 3-4 are specifically used to illustrate different problems that may arise with prior art solutions for generating transactional data.

With reference now to FIG. 3, a block diagram illustrates a typical configuration of software components that generate transaction records within a transaction log. Application server 302 processes requests to access resources. Depending on the computational task that is to be completed, application server 302 may decide that it needs to retrieve information from various datastores. Application server 302 submits requests to database engine 304, thereby acting as a client with respect to database engine 304. Application server 302 and database engine 304 generate trace information that is recorded within transaction log database 306, which contains transaction records 308-312, which may represent transactions that have been completed by a variety of applications.

The code of database engine 304 contains functionality 314 to log status information when database engine 304 processes a received SQL query. The code of application server 302 has been modified with instrumentation code that generates transactional information both before and after function call 316 to database engine 304 with pre-call instrumentation 318 and post-call instrumentation 320, respectively. Pre-call instrumentation 318, post-call instrumentation 320, and SQL-processing-status functionality 314 generate transactional information that is recorded as transaction records within transaction log database 306. At some later point in time, a system management utility, such as transaction log analysis application 232 that is shown in FIG. 2, may be used to analyze the transaction records within transaction log database 306.

FIG. 3 illustrates one potential problem that may arise in a prior art solution for generating transactional data in a data processing system. In the example that is shown in FIG. 3, it may be assumed that database engine 304 has not or cannot be modified to contain instrumentation code that is similar to instrumentation code within application server 302. For example, application server 302 may be sold by one vendor and database engine 304 may be sold by another vendor, and the operator of an enterprise domain that contains application server 302 and database engine 304 cannot ensure that application server 302 and database engine 304 generate transactional information records with similar content.

Hence, while both application server 302 and database engine 304 generate transactional log data, application server 302 may generate transactional log data with different content than the transactional log data that is generated by database engine 304. For example, application server 302 may log a specific type of transactional identifier, yet when application server 302 calls database engine 304, application server 302 may not able to pass the transactional identifier to database engine 304. Thus, there may not be a common correlator between instrumentation in application server 302 and the SQL-processing-status functionality in database engine 304. Subsequently, when a transactional log analysis management utility attempts to correlate transactional information from disparate sources, it may be required to do so by means other than a transactional identifier, e.g., by temporally ordering information through the use of timestamps within the transactional information records.

With reference now to FIG. 4, a block diagram illustrates a typical configuration of servers along with a proxy server in an enterprise domain. Application servers 402-406 send database requests to database servers 412-416 via proxy server 418; database servers 412-416 generate transactional log information in a manner similar to database engine 304. In the exemplary configuration that is shown in FIG. 4, proxy server 418 acts as a load-balancer so that the processing load that is presented to database servers 412-416 by the requests from application servers 402-406 is evenly distributed, thereby ensuring better responses times.

FIG. 4 illustrates one potential problem that may arise in a prior art solution for generating transactional data in a data processing system. It may be assumed that database servers 402-406 are configured to associate an application identifier of a requesting application with any incoming requests, thereby ensuring that the requests are tagged with respect to the requesting application. In the example that is shown in FIG. 4, all of the database requests pass through proxy server 418, so all of the incoming requests are tagged as having been originated by proxy server 418, even though the requests were actually generated by application servers 402-406. When database servers 402-406 generate transactional log data, the transaction records contain information such that it appears as though proxy server 418 has generated all of the requests to database servers 402-406.

With FIGS. 1A-4 as background information, the present invention is now described. The present invention is directed to a method and a system that supports transactional fingerprinting with respect to database operations. Moreover, the present invention is directed to a method and a system that supports transactional fingerprinting with respect to database operations without requiring modifications to the database engine. These and other advantages are described with respect to various aspects of the present invention, which is illustrated with respect to the remaining figures.

An object of the present invention is to produce transactional log data throughout a data processing system such that the transaction log data contains common transaction identifiers that may be used to correlate information, including transactional log data that is produced by database engines or servers. As noted above, many commercially available database engines comprise functionality for logging or tracing data about the results or status of concerning its processing, including the processing of SQL statements. The present invention relies upon this pre-existing functionality to continue to log or to trace its status for the processing of SQL statements, yet the present invention provides enhancements that causes the transactional log data that is produced by database engines or servers to be more useful. Hence, the present invention also recognizes that the functionality within a database engine for processing SQL statements and then logging the status of the processing of those SQL statements does not need to be modified.

Effectively, only the client application that employs the database engine needs to be modified to contain enhanced functionality. Additionally, if the client application is already being modified to contain additional instrumentation for some purpose, then the modifications that are required by the present invention with respect to the processing of SQL statements are minimized.

More specifically, the present invention employs functionality to modify an SQL statement; the modified SQL statement includes an expression that contains a transaction identifier or correlator, and the added expression in the modified SQL statement always evaluates as TRUE, i.e. a logical true value or a boolean value of 'true'. For example, the following two SQL statements are examples of typical SQL statements that have not been modified in accordance with the present invention; SQL statement (1A) does not contain a WHERE clause, whereas SQL statement (1B) does contain a WHERE clause.

```
(1A):
SELECT   customer_name,
         MAX(total_price) max_order,
         MIN(total_price)
         FROM v_customer_totals;
(1B):
SELECT   customer_name,
         MAX(total_price) max_order,
         MIN(total_price)
         FROM v_customer_totals
         WHERE custid='123';
```

The present invention modifies these SQL statements so that the modified SQL statements include an added expression that contains a transaction identifier or correlator such that the added expression always evaluates as TRUE. For example, the following two SQL statements are examples of typical SQL statements that have been modified in accordance with the present invention; SQL statement (2A) is a modified version of SQL statement (1A), and SQL statement (2B) is a modified version of SQL statement (1B).

SQL statement (2A) corresponds to SQL statement (1A); whereas SQL statement (1A) does contain a WHERE clause, SQL statement (2A) has been modified to include a WHERE clause.

```
(2A):
SELECT   customer_name,
         MAX(total_price) max_order,
         MIN(total_price)
         FROM v_customer_totals
         WHERE 'transID:E42B815A7'='transID:E42B815A7';
```

In general, a SQL WHERE command is used to specify selection criteria, thus restricting the result of an SQL query. In the exemplary SQL statement (2A) above, the added WHERE clause contains a string that is compared to a string, wherein each string is an instance of a transaction identifier. When the strings are compared, the strings are determined to be equivalent, thereby causing the comparison to always evaluate as TRUE. Since the WHERE clause is always TRUE, the WHERE clause does not affect the remainder of the SQL statement, and the result of the evaluation of the SQL statement is not affected by the inclusion of the WHERE clause.

SQL statement (2B) corresponds to SQL statement (1B); although SQL statement (1B) does contain a WHERE clause, SQL statement (2B) has been modified to include an additional expression in the WHERE clause.

```
(2B):
SELECT   customer_name,
         MAX(total_price) max_order,
         MIN(total_price)
         FROM v_customer_totals
         WHERE custid='123' AND
         'transID:E42B8415A7'='transID:E42B8415A7';
```

In the exemplary SQL statement (2B) above, the modified WHERE clause has an additional expression that contains a string that is compared to a string, wherein each string is an instance of a transaction identifier. In a manner similar to that described above with SQL statement (1B), when the strings are compared, the strings are determined to be equivalent, thereby causing the comparison to always evaluate as TRUE. Since the additional portion of the WHERE clause is always TRUE, the additional portion of the WHERE clause does not affect the remainder of the SQL statement, and the result of the evaluation of the SQL statement is not affected by the inclusion of the additional portion of the WHERE clause.

Thus, the present invention provides a mechanism for accomplishing transactional fingerprinting in a lightweight manner. The inclusion of a transaction identifier, i.e. transaction correlator, into a modified SQL statement can be described as fingerprinting the SQL statement, i.e. uniquely identifying the modified SQL statement. Thereafter, any transactional operations on the modified SQL statement can be fingerprinted, i.e. uniquely identified. When transaction log information is generated and stored, the logged information will contain the transaction identifier, thereby also fingerprinting the logged information. By tracking the fingerprinted information through a transaction log database, the transactional operations for a given transaction or set of transactions can be correlated.

As noted above, the strings that are included in the WHERE clauses are transaction identifiers or correlators. Although the data format of the transaction identifier is a string, the string may contain a variety of information in a predetermined format. For example, the string may be composed of substrings, wherein the substrings contain a selection of data that provides information about a specific aspect of a transaction; in this manner, the transaction identifiers may be parsed to extract additional information other than a simple sequence number, e.g., an application identifier, although a sequence number may be included as a substring.

Figure 5:
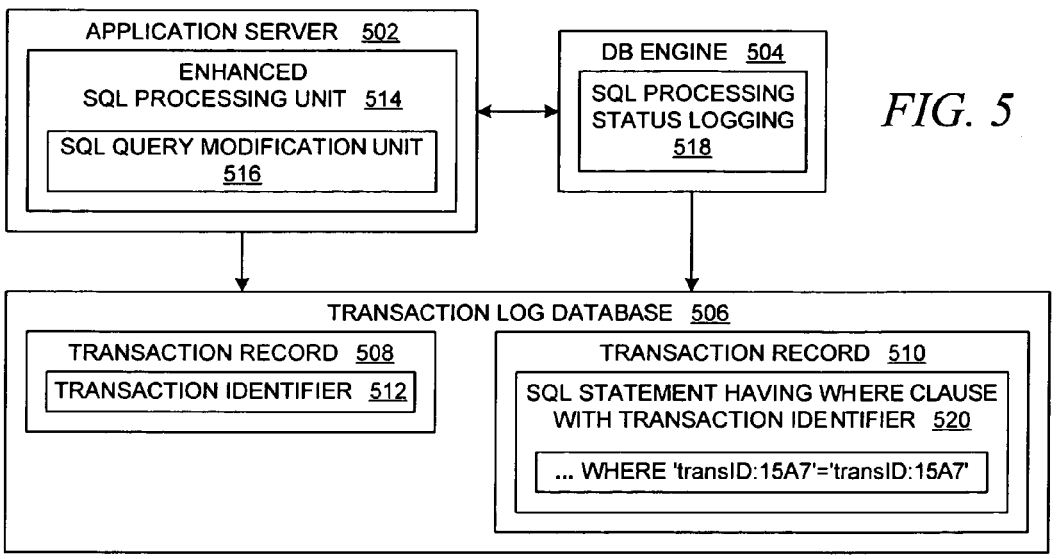
FIG. 5 depicts a block diagram that shows a configuration of software components that generate transaction records which contain a record of the processing of an SQL statement and its association with a transaction identifier in accordance with an implementation of the present invention.

With reference now to FIG. 5, a block diagram illustrates a configuration of software components that generate transaction records which contain a record of the processing of an SQL statement and its association with a transaction identifier in accordance with an implementation of the present invention. In a manner similar to that shown in FIG. 3, application server 502 processes requests to access resources. Depending on the computational task that is to be completed, application server 502 may need to retrieve information from various datastores. Application server 502 submits requests to database engine 504, thereby acting as a client with respect to database engine 504. Application server 502 and database engine 504 generate trace information that is recorded within transaction log database 506, which contains transaction records 508 and 510, which may represent transactions that have been completed by a variety of applications. Transaction record contains a copy of transaction identifier 512 that is associated with a particular transaction that application server 502 has processed.

Application server 502 has been previously modified to include enhanced SQL processing unit 514, which includes SQL query modification unit 516. As application server 502 generates SQL queries to be sent to database engine 504, the SQL queries are modified to include a WHERE clause that contains a transaction identifier in a manner similar to that explained above with respect to exemplary SQL statements (2A) and (2B). When database engine 504 receives and processes an SQL query, it logs the status of its processing operations through SQL processing status logging unit 518. In this example, the SQL statement contains a transaction identifier, so when a copy of the SQL statement is logged, transaction record 510 contains SQL statement 520 with the transaction identifier as part of the information within transaction record 510. In this manner, a database engine logs information within a transaction log database without requiring modification to the functionality of the database engine to accept a transaction identifier as an input parameter; the transaction identifier is passed via the SQL query, but the transaction identifier does not require any additional processing by a database engine other than what is already performed for a received SQL query. The transaction records can then be processed at some later point in time to correlate information that is associated with a common transaction identifier.

Figure 6:
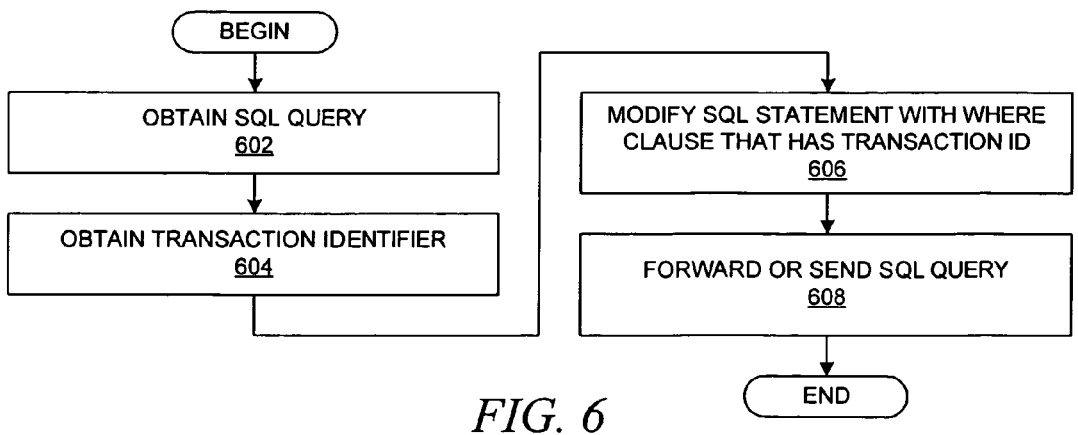
FIG. 6 depicts a flowchart that shows a process for modifying an SQL statement to include a transaction identifier in accordance with an embodiment of the present invention.

With reference now to FIG. 6, a flowchart depicts a process for modifying an SQL statement to include a transaction identifier in accordance with an embodiment of the present invention. The process that is shown within FIG. 6 may be implemented or embedded within instrumentation code or other functionality in any software or hardware module that originates, processes, forwards, or sends SQL queries to a database engine that processing SQL queries.

The process commences by obtaining an SQL query (step 602). The SQL query may be locally generated, or it may be intercepted, e.g., by a datastream filtering module, by an intermediate agent, or some other entity.

A transactional identifier is then obtained (step 604). The transaction identifier may be locally generated, or it may be retrieved from some location within the data processing system; alternatively, the transaction identifier is received as an input parameter that accompanies other data that is to be processed.

The SQL statement of the SQL query is then modified to include an added expression or clause such that the added expression or clause contains a transaction identifier or correlator and such that the added expression or clause always evaluates as TRUE (step 606).

As explained above, in cases in which an original SQL statement does not contain a WHERE clause, a WHERE clause is added to the original SQL statement, and the added WHERE clause contains a string that is compared to a string, wherein each string is an instance of a transaction identifier. When the strings are compared, the strings are determined to be equivalent, thereby causing the comparison to always evaluate as TRUE. Since the WHERE clause is always TRUE, the WHERE clause does not affect the remainder of the SQL statement, and the result of the evaluation of the SQL statement is not affected by the inclusion of the WHERE clause. In other cases in which an original SQL statement does contain a WHERE clause, an expression is added to the WHERE clause of the original SQL statement, and the added expression in the WHERE clause contains a string that is compared to a string, wherein each string is an instance of a transaction identifier. When the strings are compared, the strings are determined to be equivalent, thereby causing the comparison to always evaluate as TRUE. Since the added expression in the WHERE clause is always TRUE, the added expression does not affect the evaluation of the WHERE clause, and therefore, the added expression does not affect the evaluation of the remainder of the SQL statement. Hence, the result of the evaluation of the SQL statement is not affected by the inclusion of the added expression to the WHERE clause.

The modified SQL query is then forwarded or sent as required to its intended recipient for subsequent processing (step 608), e.g., a database engine or some other entity, and the process is concluded. At some later point in time, it is assumed that the modified SQL statement will be logged as part of its processing, and because the SQL statement includes a transaction identifier that is embedded within the expressions of the SQL statement, the transaction record that contains a copy of the logged SQL statement will also contain a copy of the transaction identifier. Thereafter, a transaction log analysis utility can correlate the logged information about the modified SQL statement with other transaction records that contain the transaction identifier, thereby assisting in the analysis of the operation of the data processing system with respect to one or more transactions.

The advantages of the present invention should be apparent in view of the detailed description of the present invention that has been provided hereinabove. The present invention provides a mechanism for embedding a transaction identifier within SQL statements without affecting the evaluation of those SQL statements. When copies of the SQL statements are logged by pre-existing functionality within various components in a data processing system, particularly database engines, the transaction log information that is associated with the processing of the modified SQL statements necessarily contains the transaction identifiers that have been embedded within the modified SQL statements. Thereafter, a transaction log analysis utility can correlate the logged information about the modified SQL statements with other transaction records that contain the transaction identifier. Moreover, the present invention provides a mechanism for embedding a transaction identifier within SQL statements without requiring modifications to the functionality within database engines, thereby negating any requirements to modify the functionality of the database engines.

More specifically, referring again to FIG. 3, the prior art was described as disadvantageous because of the need to interface an application server and a database engine in some manner. The present invention overcomes this problem by negating the requirement to modify an application server and/or a database engine to interface to transfer a transaction identifier because the present invention transfers a transaction identifier within a modified SQL statement without affecting the results of the processing of the original SQL statement.

Referring again to FIG. 4, the prior art was described as disadvantageous because some data processing systems are configured so that transaction log information indicates that a proxy server is an originator for all SQL queries. The present invention overcomes this problem by allowing information to be embedded within a modified SQL statement without affecting the results of the processing of the original SQL statement such that the actual originating application can be correctly identified in a post-processing analysis. For example, an application identifier can be included within a transaction identifier that is embedded within a modified SQL statement.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for fingerprinting transactions with respect to database operations within a data processing system, the method comprising:

obtaining an SQL query prior to its evaluation by a database engine;

obtaining a transaction identifier, wherein the transaction identifier is assigned to the SQL query to identify the SQL query;

modifying the SQL query to generate a modified SQL query, wherein the modified SQL query includes a WHERE clause that contains an expression that always evaluates to a logical true value, wherein the expression contains the transaction identifier, and wherein the transaction identifier fingerprints transactions using the modified SQL query; and sending the modified SQL query to the database engine for evaluation within the data processing system.

2. The method of claim 1 further comprising:

receiving the modified SQL query at the database engine; and recording a copy of the modified SQL query in a log database.

3. The method of claim 1 further comprising:

analyzing information in the log database to correlate records that contain the transaction identifier.

4. The method of claim 1 further comprising:

receiving the transaction identifier from an external source as an input parameter.

5. The method of claim 1 further comprising:

generating the modified SQL query by adding the WHERE clause to the SQL query in response to a determination that the SQL query does not include the WHERE clause.

6. The method of claim 1 further comprising:

generating the modified SQL query by adding to the WHERE clause in the SQL query the expression that always evaluates to a logical true value in response to a determination that the SQL query includes the WHERE clause.

7. The method of claim 1 further comprising:

generating the expression as a string that is compared to itself with a logical equal operator, wherein the string contains the transaction identifier.

8. A computer program product on a tangible computer readable medium for use in a data processing system for fingerprinting transactions with respect to database operations within the data processing system, the computer program product comprising:

means for obtaining an SQL query prior to its evaluation by a database engine;

means for obtaining a transaction identifier, wherein the transaction identifier is assigned to the SQL query to identify the SQL query;

means for modifying the SQL query to generate a modified SQL query, wherein the modified SQL query includes a WHERE clause that contains an expression that always evaluates to a logical true value, wherein the expression contains the transaction identifier, and wherein the transaction identifier fingerprints transactions using the modified SQL query; and means for sending the modified SQL query to the database engine for evaluation within the data processing system.

9. The computer program product of claim 8 further comprising:

means for receiving the modified SQL query at the database engine; and means for recording a copy of the modified SQL query in a log database.

10. The computer program product of claim 8 further comprising:

means for analyzing information in the log database to correlate records that contain the transaction identifier.

11. The computer program product of claim 8 further comprising:

means for receiving the transaction identifier from an external source as an input parameter.

12. The computer program product of claim 8 further comprising:

means for generating the modified SQL query by adding the WHERE clause to the SQL query in response to a determination that the SQL query does not include the WHERE clause.

13. The computer program product of claim 8 further comprising:

means for generating the modified SQL query by adding to the WHERE clause in the SQL query the expression that always evaluates to a logical true value in response to a determination that the SQL query includes the WHERE clause.

14. The computer program product of claim 8 further comprising:

means for generating the expression as a string that is compared to itself with a logical equal operator, wherein the string contains the transaction identifier.

15. An apparatus for fingerprinting transactions with respect to database operations within a data processing system, the apparatus comprising:

means for obtaining an SQL query prior to its evaluation by a database engine;

means for obtaining a transaction identifier, wherein the transaction identifier is assigned to the SQL query to identify the SQL query;

means for modifying the SQL query to generate a modified SQL query, wherein the modified SQL query includes a WHERE clause that contains an expression that always evaluates to a logical true value, wherein the expression contains the transaction identifier, and wherein the transaction identifier fingerprints transactions using the modified SQL query; and means for sending the modified SQL query to the database engine for evaluation within the data processing system.

16. The apparatus of claim 15 further comprising:

means for receiving the modified SQL query at the database engine; and means for recording a copy of the modified SQL query in a log database.

17. The apparatus of claim 15 further comprising:

means for analyzing information in the log database to correlate records that contain the transaction identifier.

18. The apparatus of claim 15 further comprising:

means for generating the modified SQL query by adding the WHERE clause to the SQL query in response to a determination that the SQL query does not include the WHERE clause.

19. The apparatus of claim 15 further comprising:

means for generating the modified SQL query by adding to the WHERE clause in the SQL query the expression that always evaluates to a logical true value in response to a determination that the SQL query includes the WHERE clause.

20. The apparatus of claim 15 further comprising:

means for generating the expression as a string that is compared to itself with a logical equal operator, wherein the string contains the transaction identifier.

* * * * *